Sept. 23, 1958

H. B. DAVIS 2,853,097

ANTI-CORROSIVE VALVE STRUCTURE

Filed Aug. 11, 1955

INVENTOR
HERBERT B. DAVIS

BY
*Cushman, Darby & Cushman*
ATTORNEYS

Sept. 23, 1958     H. B. DAVIS     2,853,097
ANTI-CORROSIVE VALVE STRUCTURE
Filed Aug. 11, 1955     4 Sheets-Sheet 2
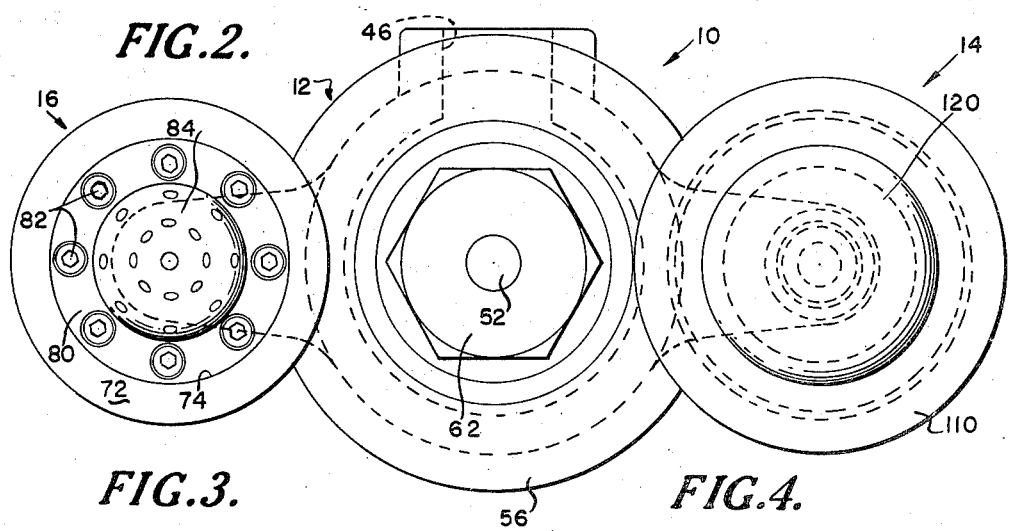
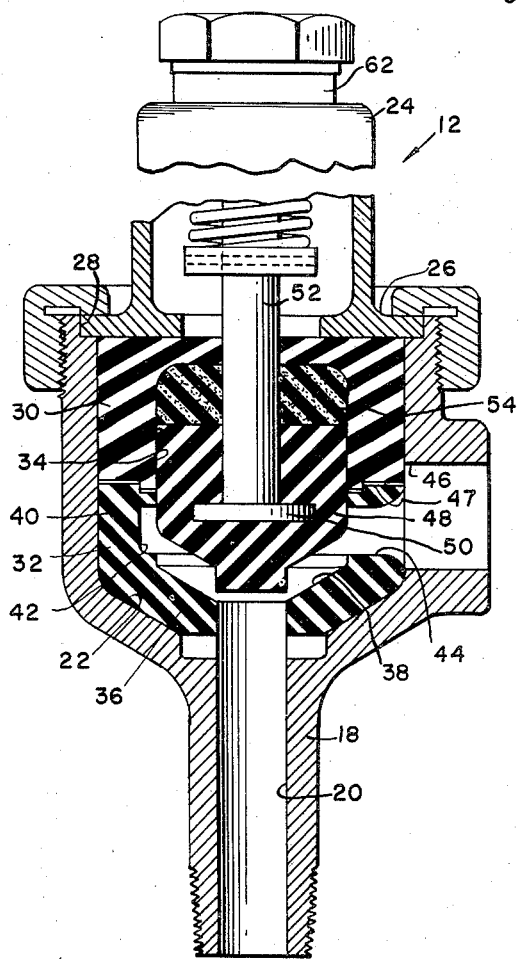
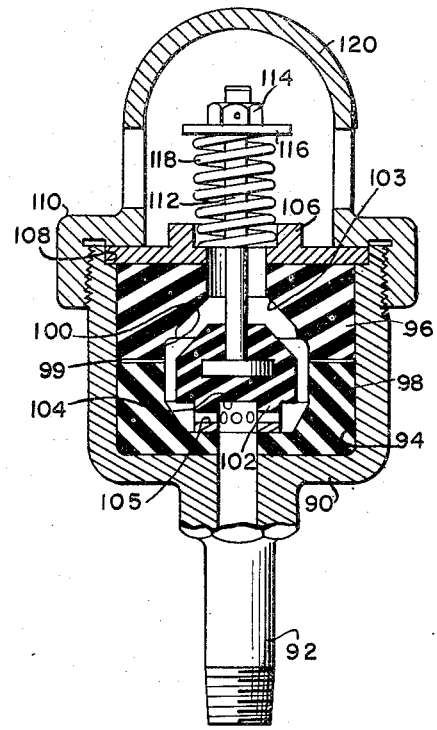
INVENTOR
HERBERT B. DAVIS
BY *Cushman, Darby & Cushman*
ATTORNEYS Sept. 23, 1958     H. B. DAVIS     2,853,097
ANTI-CORROSIVE VALVE STRUCTURE
Filed Aug. 11, 1955     4 Sheets-Sheet 3

INVENTOR
HERBERT B. DAVIS

BY Cushman, Darby & Cushman
ATTORNEYS

Sept. 23, 1958     H. B. DAVIS     2,853,097
ANTI-CORROSIVE VALVE STRUCTURE
Filed Aug. 11, 1955     4 Sheets-Sheet 4

INVENTOR
HERBERT B. DAVIS

BY Cushman, Darby & Cushman
ATTORNEYS

United States Patent Office 2,853,097
Patented Sept. 23, 1958

2,853,097

ANTI-CORROSIVE VALVE STRUCTURE

Herbert B. Davis, Columbia, S. C.

Application August 11, 1955, Serial No. 527,677

8 Claims. (Cl. 137—515)

This invention relates to improvements in valve constructions and more particularly to an improved valve construction for use with materials which are corrosive to metals such as acids, ammonium nitrate solutions, ammonium-nitrate-urea solutions ammonium nitrate-anhydrous ammonia-water solutions and the like including volatile gases having corrosive characteristics.

The fertilizer industry is particularly concerned with the effects of corrosive activity on safety valves and other valves which may be damaged by corrosion to the point that they do not function properly. For example, tank cars used to transport nitrogen solutions are equipped with some sort of safety device and even two identical devices for added safety. Such devices in many instances comprise valves which release but will not properly reseat due to corrosive activity both in their tension controls and sealing mediums. Safety devices of the rupture disk type have been employed in some instances and are very effective, but result in large losses of nitrogen because they do not reseat. Moreover, fertilizer manufacturers employ safety devices in pressure systems operable to unload and handle nitrogen solutions and they too are plagued with corrodible safety devices resulting in loss of time and money.

Accordingly, it is an object of the present invention to provide a valve construction having all metal components thereof protected from corrosive activity while either in closed or open position.

Another object of the present invention is the provision of a novel return valve construction having improved means for protecting the tension controls thereof from corrosive activity during the release operation.

A still further object of the present invention is the provision of a valve construction having improved means for protecting the sealing mediums thereof from corrosive activity during both the set and release operations.

Still another object of the present invention is the provision of an improved safety relief valve embodying a plural safety factor, thus eliminating the need of utilizing two or more safety devices in a given system.

Still another object of the present invention is the provision of a check valve having improved means for protecting the tension controls and sealing mediums thereof against corrosive activity.

A still further object of the present invention is the provision of a valve construction of the type described which provides a maximum of safety, is simple in operation and economical to manufacture and maintain.

These and other objects of the present invention will become more apparent during the course of the following detailed description and appended claims.

The invention may best be understood with reference to the accompanying drawings wherein illustrative embodiments are shown.

In the drawings:

Figure 2 is a top plan view of the device shown in Figure 1;

Figure 3 is a vertical sectional view of the safety relief valve of the device showing the same in its opened or release position;

Figure 4 is a vertical sectional view of the vacuum relief valve of the device showing the same in its opened or release position;

Figure 1:
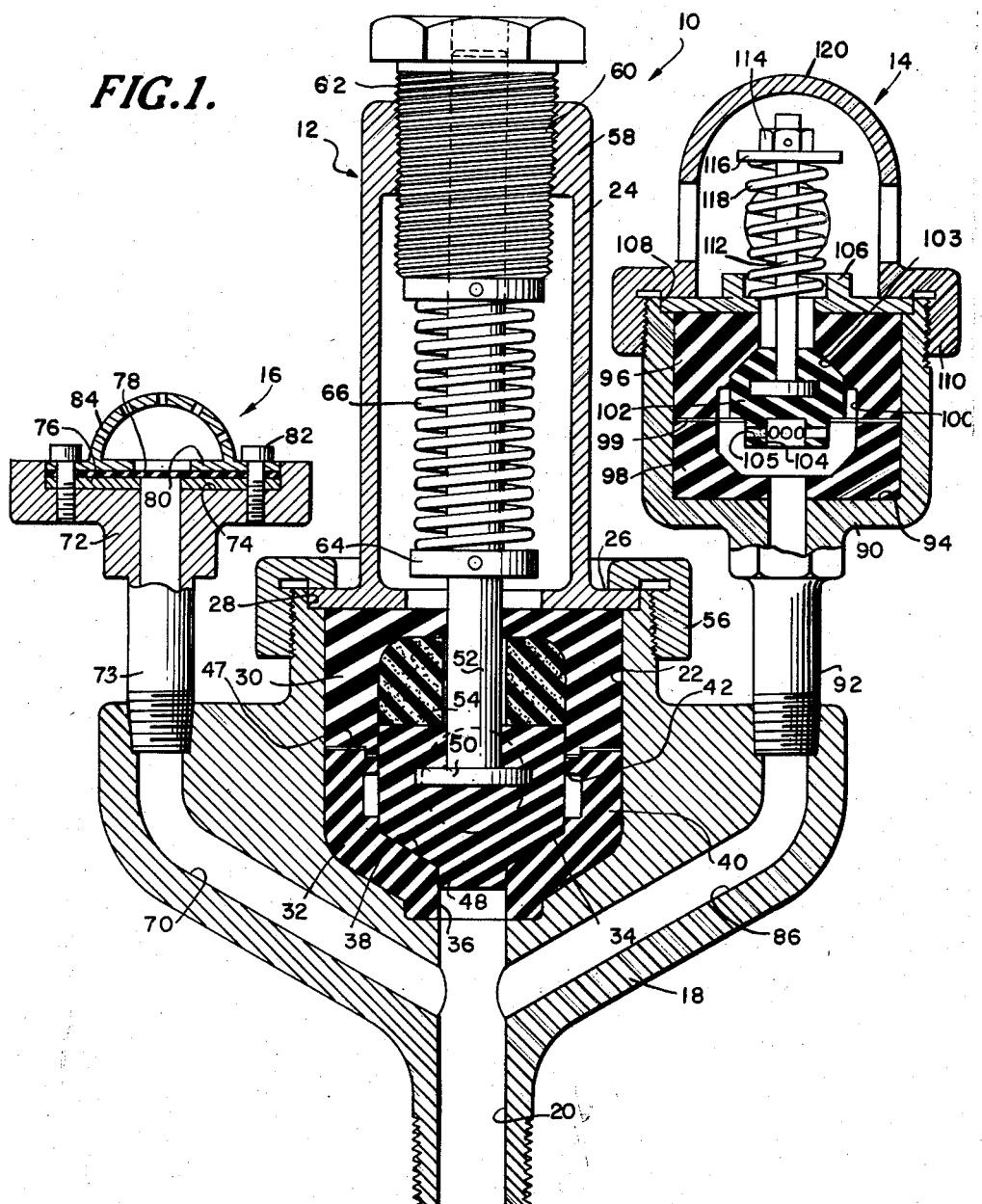
Figure 1 is a vertical sectional view of a safety device embodying the principles of the present invention.
Figure 6:
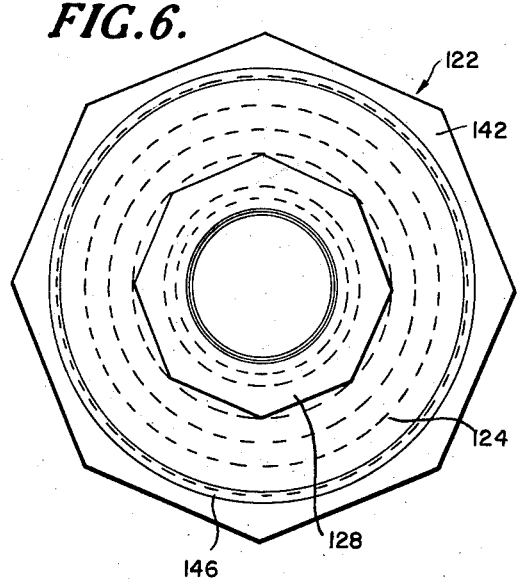
Figure 6 is an end view of the check valve shown in Figure 5.
Figure 7:
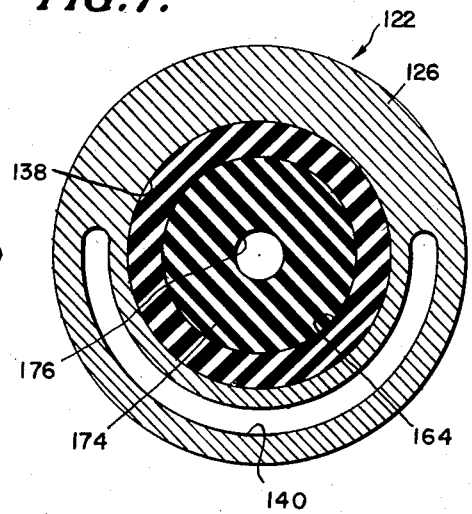
Figure 7 is a cross-sectional view taken along the line 7—7 of Figure 5.

Referring now more particularly to the drawings, there is shown in Figure 1 a safety device, generally indicated at 10, which includes a safety relief valve 12 operable to release the pressure of a system to which the device is connected when the same reaches a predetermined upper limit, a vacuum relief valve 14 which is operable to release the vacuum pressure in the system when the same reaches a predetermined lower limit and a rupture disk valve 16 which is operable to expose the system to the atmosphere when the pressure therein reaches a predetermined maximum upper limit.

The safety device 10 includes a valve body 18 which may be made of metal or the like, such as cast iron, brass, bronze and so forth. The metal of the valve body need not be corrosive resistant since the construction of the device is such as to prevent corrosion of the sealing mediums and tension controls of the device as will hereinafter be more fully described. The valve body includes a main inlet passageway 20 extending longitudinally through the valve body from its lower end. A counterbore 22 is formed in the upper end of the valve body and provides a cavity for receiving the relief valve 12.

Insofar as the relief valve 12 is concerned, the valve body 18 constitutes one section or member of the entire body that houses the valve. The other section, indicated at 24, comprises a cylindrical member having a lower apertured end wall 26 which is adapted to seat within an annular recess 28 formed in the upper interior edge of the counterbore 22. This wall 26 cooperates with the counterbore 22 to define a cavity having upper and lower liner sections 30 and 32 mounted therein which together define a valve chamber 34. The lower liner section 32 is substantially cup-shaped in configuration and includes an apertured end wall 36 which provides a frusto-conical valve seat 38 surrounding the upper end of the inlet passageway 20. The lower section also includes a peripheral wall 40 extending upwardly from the end wall 36 which is provided with an annular outlet recess 42 and an opening 44 extending therefrom through the peripheral wall into communication with a transversely extending outlet port 46 formed in the valve body 18. Preferably, the engaging ends of the sections are stepped and provided with a suitable sealing member, such as a gasket 47.

Mounted within the valve chamber 34 for movement toward and away from the valve seat 38 is a valve member 48 having a shape conforming generally to the interior of the lower liner section 32. Suitably secured within the valve member 48, as by an annular flange 50, is a valve stem 52 which extends through a suitable aperture formed in the upper liner section 30 and the apertured end wall 26 of the section 24.

Disposed in the remaining portion of the valve chamber is a resilient or compressible member 54 which engages the valve member at all times and substantially fills the remainder of the valve chamber.

It will be noted that the section 24 operates to maintain the liner sections within the valve body cavity 22 and is in turn secured to the valve body by any suitable means, such as flanged ring 56 threadedly mounted on the valve body 18. As shown in Figures 1 and 3, the flanged ring 56 has an inwardly extending portion adapted to contact the outer portion of the end wall 26 so as to secure the same within the recess 28.

The valve body section 24 includes an upper end wall 58 having an interiorly threaded opening 60 formed therein. Threadedly mounted within this opening is an exteriorly threaded sleeve 62 having its upper end formed in hexagonal shape to receive a wrench or the like for turning purposes. The sleeve 62 slidably receives the upper end of the valve stem 52 and the latter is provided with a collar 64 suitably mounted thereon between its ends. The coil spring 66 surrounds the central portion of the valve stem and has its upper end in engagement with the lower end of the sleeve 62 and its lower end in engagement with the collar 64. Spring 66 thus acts to resiliently urge the valve member 48 downwardly into engagement with the valve seat 38. The force applied by the spring member is varied by turning sleeve 62.

The rupture disk valve 16 is threadedly mounted within the valve body 18 in communication with a branch passageway 70 which, in turn, communicates with the main inlet passageway 20. As shown in Figure 1, the rupture disk 16 comprises a valve body 72 having an exteriorly threaded nipple 73 on its lower end for engagement within the valve body 18. The upper end of the valve body 72 is provided with a counterbore 74 within which a circular apertured member 76 is seated. Mounted above the member 76 within the counterbore 74 is a rupture disk 78 and a cooperating annular member 80 is disposed above the disk 78 within the counterbore 74. A plurality of circumferentially spaced bolts 82 or the like extend through members 80 and 76 and into the valve body so as to removably secure the rupture disk 78 therein. Preferably, the member 80 includes an apertured dome 84 which serves to prevent parts of the rupture disk from flying outwardly when the same ruptures.

The vacuum relief valve 14 is similarly mounted within the valve body 18 in communication with a second branch pasageway 86 which, in turn, communicates with the main inlet passageway 20. The valve 14 comprises a valve body 90 having an exteriorly threaded nipple 92 extending downwardly from its lower end for engagement with the valve body 18. The upper end of the valve body has a counterbore 94 formed therein which constitutes a cavity for receiving a pair of liner sections 96 and 98 similar to the sections 30 and 32 previously described. As before, a gasket 99 is disposed between the liner sections and together they define a valve chamber 100 within which a valve member 102 is mounted for reciprocating movement. In the present instance, however, the upper liner section 96 defines a valve seat 103 against which the valve member 102 is adapted to engage and the lower end of the valve member is provided with a recess 104 having a plurality of apertures 105 extending radially outwardly therefrom. A second valve body section 106 in the form of a circular aperture member is mounted within an annular recess 108 formed in the interior peripheral edge of the valve body 90 and a flanged ring 110 is threadedly mounted on the valve body 90 so as to secure the section 106 on the body 90.

A valve stem 112 is suitably embedded in the valve member and extends upwardly therefrom through the valve body section 106. The upper end of the valve stem 112 is threaded to receive a nut 114 having a washer 116 in engagement therewith. Extending between the washer 116 and section 106 in surrounding relation to the valve stem 112 is a coil spring 118 which acts to resiliently urge the valve member 102 upwardly into engagement with the valve seat 103. Preferably, the flanged ring 110 includes an apertured dome 120 which surrounds the upper end of the valve stem 112 and coil spring 118.

Referring now to Figures 4-10 of the drawings, there is shown a check valve, generally indicated at 122, which embodies the principles of the present invention. This valve comprises a pair of cooperating valve body members or sections 124 and 126. The section 124 constitutes the inlet side of the valve and includes an inlet hub 128 having its interior suitably threaded to receive a pipe or the like in the conventional manner. The opposite end of the section 124 is provided with a counterbore 130 having outlet port 132 extending transversely therefrom. This port 132 communicates with a semi-cylindrical passageway 134 which extends inwardly from the opposite end of the section 124 outwardly of the counterbore 130.

The section 126 constitutes the outlet side of the valve and has an outlet hub 136 formed at one end thereof which is suitably interiorly threaded to receive a pipe or the like in a conventional manner. The opposite end of the section 126 includes a counterbore 138 and a semi-cylindrical passageway 140 extends inwardly from the opposite end of the valve section 126 into communication with the outlet hub 136. In their operative position, the sections 124 and 126 are mounted together so that the semi-cylindrical passageways 134 and 140 are in communication and the counterbores 130 and 138 are aligned to form a main valve body cavity. The sections may be secured in any suitable manner preferably, however, a flanged ring 142 may be engaged with a cooperating annular flange 144 formed on one of the sections, such as section 126, and threadedly engaged within threads 146 formed on the other section, such as section 124. Moreover, it is preferred to provide interengaging elements on the sections to insure that the two will properly register. Thus, the peripheral end of section 124 may be provided with a longitudinally extending tapered flange 148 which is adapted to engage a cooperating tapered surface of flange 150 formed in the section 126.

Figure 5:
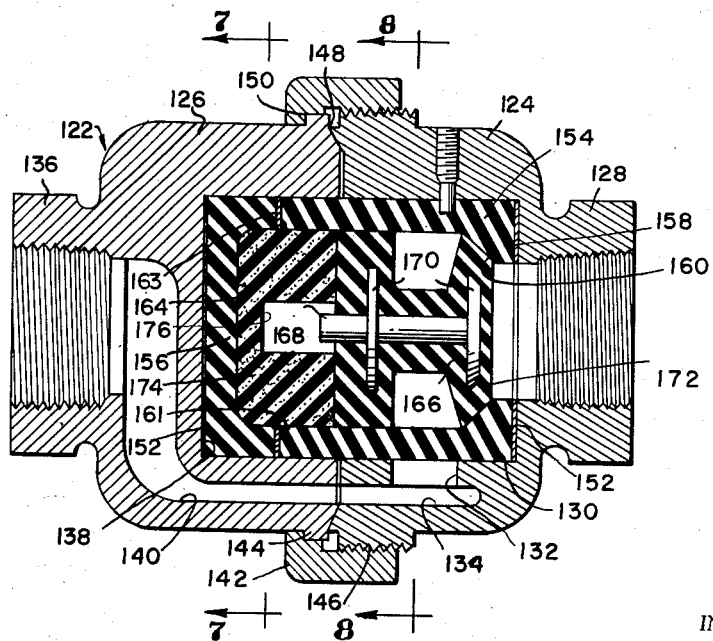
Figure 5 is a vertical sectional view of a check valve embodying the principles of the present invention.
Figure 9:
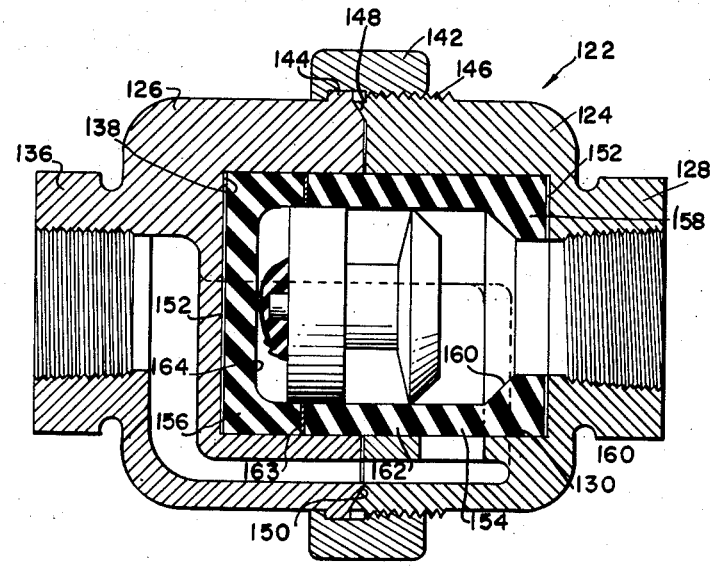
Figure 9 is a view similar to Figure 5 showing the check valve in its opened or release position.
Figure 8:
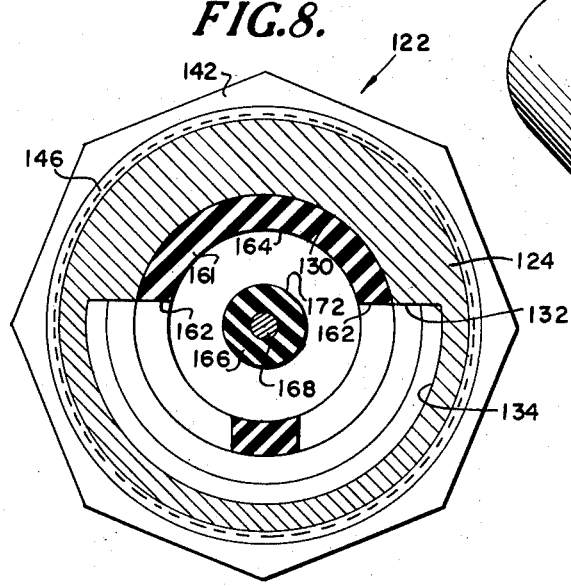
Figure 8 is a cross-sectional view taken along the line 8—8 of Figure 5.
Figure 10:
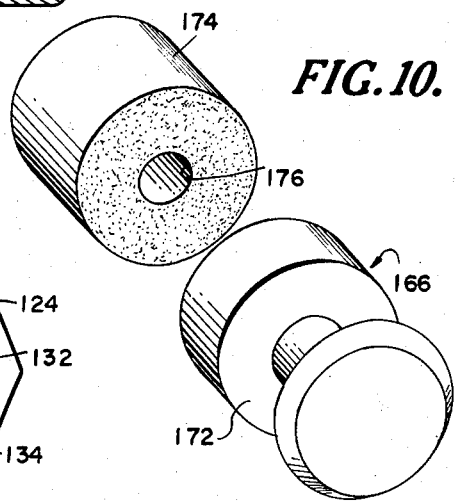
Figure 10 is a detailed perspective view of two of the component parts of the check valve.

Mounted within each end of the cavity formed by the counterbores 130 and 138 is a gasket 152 and a pair of liner sections 154 and 156 are disposed within the cavity in engagement with the gaskets. The section 154 is of general cup-shaped configuration and includes an apertured end wall 158 surrounding the inlet hub 128 of the section 154 and forming a frusto-conical valve seat 160 therefor. The liner section 154 further includes a peripheral wall 161 extending from the end wall 158 and having outlet openings 162 therein which register with outlet port 132. A gasket 163 is disposed between the engaging ends of the liner sections 154 and 156 and together they define an inner valve chamber 164 within which a valve member 166 is mounted for movement toward and away from the valve seat 160. As best shown in Figures 5 and 10, the valve member comprises a metallic rod 168 having longitudinally spaced annular flanges formed thereon. Formed around the rod 168 and flanges 170 is a covering 172 having one end shaped to conform with the frusto-conical shape of the valve seat 160 and its opposite end formed in substantial disk shape. A resilient or compressible member 174 is disposed within the remainder of the valve chamber 164 and includes a central recess 176 within which the protruding end of the rod 168 is adapted to extend.

From the above, the operation of the various valves disclosed is believed to be apparent. The significant feature of the present construction is the fact that the tension control and sealing mediums of the various valves are all protected against corrosive activity. To this end, the valve member is preferably made of hard rubber, plastic or the like. For example, in the embodiment disclosed, the valve member consists of rubber having a plastometer reading of from 60 to 80. Likewise, the liner sections are also preferably made of a rubber or plastic material, for example, hard rubber having a plastometer reading of approximately 0.2. The compressible member within the valve chamber is also preferably made of a rubber or plastic material, for example, in the embodiments disclosed, the compressible member is made of a soft rubber having a 1:3 compression ratio. It will be noted that this member serves to resiliently urge the associated valve member into engagement with its valve seat as illustrated in connection with the relief valve in Figure 1 and of the check valve in Figure 5. In the opened or released position illustrated in Figures 3 and 9, the compressible member has been compressed within the valve chamber to approximately ⅓ of the volume which it originally occupied. Preferably, this member is free from direct attachment to the associated valve stem but is cemented or vulcanized to the associated valve member so as to insure a perfect seal between the two rubber members and thus, eliminate the possibility of the corrosive material contacting the valve stem. Moreover, this construction permits greater movement of the soft rubber compressible member.

Furthermore, it will be noted that the flanged rings, which secure the valve body sections together also act to secure the liner sections within the valve chamber in that the upper valve body section engages the upper liner section. Preferably, the assembly of the valve is accomplished under slight pressure so as to insure a spontaneous action when release begins, which action seals the tension controls from any corrosive activity. The gasket between the engaging ends of the liner sections is provided mainly for the purpose of varying the set or closed pressure engagement of the rubber members within the valve chamber at the time of assembly.

With the exemplary materials set forth above, it is preferred to limit the operating temperatures of the valves to below 160° F. The hard rubber exemplified above for the liner sections will begin to soften at 180° F., while the soft rubber does not begin to harden until 280° F. is reached. All of the rubbers exemplified will operate at minus 40° F. Expansion and contraction factors are negligible to the extent that inefficiency of operation would not result. Where operating temperatures of 160 to 250° F. are encountered, it is preferable to employ a material embodying fiber glass or the like or one of the many other suitable plastics commercially available.

It can thus be seen that there has been provided a valve construction which may be utilized in systems handling corrosive materials without danger that the tension controls or sealing mediums of the valve will be attacked by corrosive activity. If desired, the inlet and outlet passageways of the valve body may be lined with a rubber coating or the like, but this procedure is not required since the main operating components of the valve are corrosive resistant.

The check valve is constructed so as to be operable in any position and it is assembled in the same manner as an ordinary pipe union. This construction is advantageous in that it can be quickly repaired and replaced without disturbing any other portions of the pipe lines employed. It is particularly beneficial in industries where corrosive materials are being handled and provides positive protection of the equipment against the effects of corrosive activity. For example, where air pressure is being applied to a tank containing nitrogen solutions, the valve will remain seated and will not permit the solution to seep into the air compressor which would result in excessive damage through corrosive activity to the brass components thereof. The check valve operates to eliminate return flow and since it is corrosive resistant, there is no danger that return flow will be permitted due to failure resulting from corrosion.

It is also to be understood that the forms of the invention herewith shown and described are to be taken as the preferred embodiments of the same and that various changes may be made without departing from the spirit of the invention or the scope of the appended claims.

I claim:
1. In a corrosive resistant valve construction, a first valve body section having a cavity formed therein, said cavity being open at one end and having a port communicating with the other end thereof, a first corrosive resistant liner section having a portion disposed within said cavity adjacent said port providing a valve seat therefor, a second corrosive resistant liner section cooperating with said first liner section to form a valve chamber, a second valve body section engaging said second liner section, means for securing said second valve body section to said first valve body section so that said liner sections will be secured in cooperative relation, a corrosive resistant valve movable in said valve chamber toward and away from said port, a second port communicating with said chamber, and a deformable resilient member of rubber or the like disposed within said chamber in resilient engagement with the chamber walls and said valve member for biasing the latter toward said valve seat.

2. A valve construction as defined in claim 1 wherein said valve member is provided with a valve stem extending through said resilient member and outwardly of said chamber, and spring means connected with said valve stem outwardly of said chamber for additionally urging said valve member toward said first-mentioned port.

3. In a corrosive resistant valve construction, a valve body having an inlet, an outlet and a main cavity communicating between said inlet and outlet, corrosive resistant liner means disposed within said cavity throughout the same, said liner means including a cylindrical wall and opposed end walls engaging the interior of said cavity and providing a valve chamber, said cylindrical wall being apertured for communication with the valve body outlet, one of said end walls being apertured adjacent said valve body inlet and defining a valve seat therefor, a corrosive resistant valve member disposed within the portion of said chamber adjacent said valve seat and being movable toward and away from the latter, and corrosive resistant resilient means disposed in the remaining portion of said chamber in resilient engagement with the walls thereof and with said valve member for biasing said valve member toward said valve seat, said resilient means being deformable into tighter resilient engagement with said chamber walls and said valve member in response to movement of the latter away from said valve seat.

4. A valve construction as defined in claim 3 wherein said valve member is provided with a valve stem extending through said resilient means and outwardly of said chamber, and spring means disposed outwardly of said chamber for urging said valve member toward said valve seat.

5. In a corrosive resistant valve construction, a valve body member having a cavity formed therein, said cavity being open at one end and having a longitudinally extending inlet port and a transversely extending outlet port communicating therewith, a corrosive resistant cup-shaped liner member disposed in said cavity, said liner member having an apertured end wall surrounding said inlet port providing a valve seat therefor and a peripheral wall extending from said end wall provided with an opening communicating with said outlet port, a corrosive resistant valve member mounted in said liner member for movement toward and away from said valve seat, and means secured to the open end of said valve body member for enclosing said valve member, said means including a corrosive resistant compressible member disposed in engagement with said valve member and operable to resiliently urge the latter toward said valve seat.

6. A valve construction as defined in claim 10 wherein said means also includes a second valve body member having a passageway therein communicating with the outlet port of said first-mentioned valve body member.

7. A valve construction as defined in claim 5 wherein said means also includes a second valve body member having a sleeve threadedly mounted therein in longitudinally spaced relation from the open end of said first-mentioned valve body member, a valve stem extending longitudinally from said valve member through said compressible member and said sleeve, and a spring between said sleeve and said valve stem.

8. In a corrosive resistant valve construction, a valve body having an inlet, an outlet and a main cavity communicating between said inlet and said outlet, corrosive resistant liner means disposed within said cavity throughout the same, said liner means including a pair of cooperating generally cup-shaped members inverted with respect to each other, one of said cup-shaped members having an end wall apertured adjacent the valve body inlet so as to define a valve seat therefor and an annular wall apertured for communication with the valve body outlet, a corrosive resistant valve member disposed within the portion of said chamber adjacent said valve seat and being movable toward and away from the latter, and corrosive resistant resilient means disposed in the remaining portion of said chamber in resilient engagement with the walls thereof and with said valve member for biasing said valve member toward said valve seat, said resilient means being deformable into tighter resilient engagement with said chamber walls and said valve member in response to movement of the latter away from said valve seat.

References Cited in the file of this patent

UNITED STATES PATENTS

| 661,603 | Gold | Nov. 13, 1900 |
| 957,347 | Kennedy | May 10, 1910 |
| 1,515,999 | Clark | Nov. 18, 1924 |
| 2,118,300 | Ford | May 24, 1938 |
| 2,295,774 | Corydon | Sept. 15, 1942 |
| 2,401,237 | Gamble | May 28, 1946 |
| 2,628,062 | Weber | Feb. 10, 1953 |
| 2,675,204 | Johnson | Apr. 13, 1954 |
| 2,699,801 | Schleyer | Jan. 18, 1955 |